US009149112B2

(12) United States Patent
Yeh

(10) Patent No.: US 9,149,112 B2
(45) Date of Patent: Oct. 6, 2015

(54) ROOF ASSEMBLY FOR STORAGE CART

(71) Applicant: Jen-Ren Yeh, Chang Hua Hsien (TW)

(72) Inventor: Jen-Ren Yeh, Chang Hua Hsien (TW)

( * ) Notice: Subject to any disclaimer, the term of this patent is extended or adjusted under 35 U.S.C. 154(b) by 372 days.

(21) Appl. No.: 13/693,846

(22) Filed: Dec. 4, 2012

(65) Prior Publication Data

US 2014/0001136 A1    Jan. 2, 2014

(30) Foreign Application Priority Data

Jun. 29, 2012   (TW) .............................. 101212625 U

(51) Int. Cl.
  *A47B 47/00*    (2006.01)
  *A47B 31/00*    (2006.01)
  *A47B 47/02*    (2006.01)
  *F16B 12/40*    (2006.01)

(52) U.S. Cl.
  CPC ................ *A47B 47/00* (2013.01); *A47B 31/00* (2013.01); *A47B 47/024* (2013.01); *A47B 2031/003* (2013.01); *A47B 2031/004* (2013.01); *F16B 2012/406* (2013.01)

(58) Field of Classification Search
  CPC ............ B65D 7/14; B65D 7/20; A47B 67/04; A47B 55/02; A47B 47/00; A47B 47/024; A47B 31/00; A47B 2013/003; A47B 2013/004; A47F 5/13; A47F 5/137; A47F 5/14; F16B 2012/406
  USPC ................. 220/485, 491, 493, 494, 640–642; 211/126.8, 126.9, 126.14, 126.15, 211/133.5
  See application file for complete search history.

(56) References Cited

U.S. PATENT DOCUMENTS

| | | | | |
|---|---|---|---|---|
| 2,575,965 | A  * | 11/1951 | Malm | 285/191 |
| 3,120,323 | A  * | 2/1964 | Sparling | 206/505 |
| 4,795,041 | A  * | 1/1989 | Remmers | 211/126.15 |
| D303,444 | S  | 9/1989 | Yoshikawa | |
| 5,279,441 | A  * | 1/1994 | Featherall | 220/485 |
| 6,718,635 | B2 * | 4/2004 | Cheng et al. | 29/896.6 |
| 7,228,985 | B2 * | 6/2007 | Yeh | 220/485 |
| 7,270,245 | B2 * | 9/2007 | Cheng et al. | 220/62.1 |
| 7,428,976 | B2 * | 9/2008 | Cheng et al. | 220/642 |
| 7,798,343 | B2 | 9/2010 | Wang | |
| 8,006,858 | B2 * | 8/2011 | Cheng et al. | 220/485 |
| 8,141,737 | B1 * | 3/2012 | Tsai | 220/485 |
| 8,584,889 | B2 * | 11/2013 | Cheng et al. | 220/485 |
| 2005/0205578 | A1* | 9/2005 | Yeh | 220/485 |

* cited by examiner

*Primary Examiner* — Patrick Hawn
(74) *Attorney, Agent, or Firm* — Muncy, Geissler, Olds & Lowe, P.C.

(57) ABSTRACT

A roof assembly for a storage car includes a supporting element, a pair of first fixing elements, a pair of second fixing elements, and four connecting elements. The pair of first fixing elements and the pair of second fixing elements engage and cover around the periphery of the supporting element. Two of the four connecting elements are mounted at two opposite ends of each of the first fixing elements. Therefore, a storage cart including a frame and holes does not need to install or form additional supports for connecting with the roof assembly. Fasteners can pass through the holes of the storage cart and engage with the connecting elements to cause the roof assembly securely connected with the storage cart.

12 Claims, 6 Drawing Sheets

ROOF ASSEMBLY FOR STORAGE CART

BACKGROUND OF THE INVENTION

1. Field of the Invention

The present invention relates to a roof assembly and, in particular, to a roof assembly is adapted to be firmly mounted on a storage cart.

2. Description of the Related Art

Various stated conventional storage carts has at least one removable drawer for receiving objects, and removable casters providing easy mobility. The storage cart is foldable or removable for easy storage or transport. Therefore, due to the widespread use of the storage carts, reducing manufacturing costs and maintaining the structural strength of the storage cart are desirously solved.

U.S. Pat. No. 7,798,343, Wang and U.S. Patent No. D303, 444, Yoshikawa both disclose a top panel mounted on a storage cart. However, the vast majority of the top panel is made of a metal plate to be formed one-piece structure with surface treatments thereon, such as electroplate. Then the top panel is punched to form holes therein. However, such conventional top panel formed with surface treatments to prevent rust and punched holes are too many manufacturing processes and drastically increase manufacturing costs.

Moreover, if the weight of the top panel is too heavy over than the structural strength of the storage cart, the storage cart can not withstand the weight of the top panel and has the possibility of disintegration. Additionally, the weight of the top panel is too heavy for hard assembling and transporting.

Furthermore, the top panel is directly bent its two opposite edges to form two arc portions, and the storage cart must includes two additional cylindrical supports for attached and supporting the two arc portions of the top panel. Such connection between the storage cart and the top panel is not a firmly and securely contact, rather than a high reliability of the connection method.

The present invention is, therefore, intended to obviate or at least alleviate the problems encountered in the prior art.

SUMMARY OF THE INVENTION

The present invention solves this need and other problems in the field of storage cart by providing a roof assembly including a supporting element, a pair of first fixing elements, a pair of second fixing elements, and four connecting elements. The pair of first fixing elements and the pair of second fixing elements engage and cover around the periphery of the supporting element. Two of the four connecting elements are mounted at two opposite ends of each of the first fixing elements. Therefore, a storage cart including a frame and holes does not need to install or form additional supports for connecting with the roof assembly. Fasteners can pass through the holes of the storage cart and engage with the connecting elements to cause the roof assembly securely connected with the storage cart.

In an example, the connecting element is a nut, and the fasteners are screws.

Preferably, each of the first fixing elements includes two connecting ends disposed at two opposite ends thereof, external and internal faces, and a first gap extending between the two connecting ends and connecting with the external and internal faces thereof. The two first gaps of the pair of first fixing elements are engaged with and cover two side edges of the supporting element.

Preferably, each of the second fixing elements includes two engaging ends disposed at two opposite ends thereof, external and internal surfaces, a second gap extending between the two engaging ends and connecting with the external and internal surfaces, and two pairs of extending portions. The two second gaps of the pair of second fixing elements are respectively engaged with first and second edges of the supporting element.

Preferably, each pair of extending portions is formed an arc engaging surface connecting the internal surface. The arc engaging surface is attached to the external face of the first fixing element.

An advantage of the roof assembly for the storage cart according to the present invention is that a curvature of the arc engaging surface is same as that of the external face of the first fixing element. Therefore, the arc engaging surface of the second fixing element is able to closely attach to the external face of the first fixing element and securely connected with the external face of the first fixing element by spot welding. Moreover, junctions between the external surfaces of the pair of second fixing elements and the external faces of the pair of first fixing elements are smooth.

Another advantage of the roof assembly for the storage cart according to the present invention is that the supporting element may be made of plastic plates, cloth, or common industrial pre-forming metal mesh product, so that the supporting element is lightweight and only has a small area to need electroplated.

A further advantage of the roof assembly for the storage cart according to the present invention is that the storage cart including a frame and holes does not need to install or form additional supports for connecting with the roof assembly.

A further advantage of the roof assembly for the storage cart according to the present invention is that two of the four connecting elements are mounted in the two connecting ends of each of the first fixing elements to cause an outer periphery of each of the connecting elements closely attached against the internal face of the first fixing element. Then, the arc engaging surfaces of each pair of extending portions are closely attached to the external face of each of the first fixing elements. Therefore, the connecting elements, the first fixing elements, and the second fixing elements can securely connect to each other by one time spot welding to decrease manufacturing process and manufacturing costs.

Other objects, advantages, and new features of the present invention will become apparent from the following detailed description of the invention when considered in conjunction with the accompanied drawings.

BRIEF DESCRIPTION OF THE DRAWINGS

The illustrative embodiment may best be described by reference to the accompanying drawings where.

Figure 1:
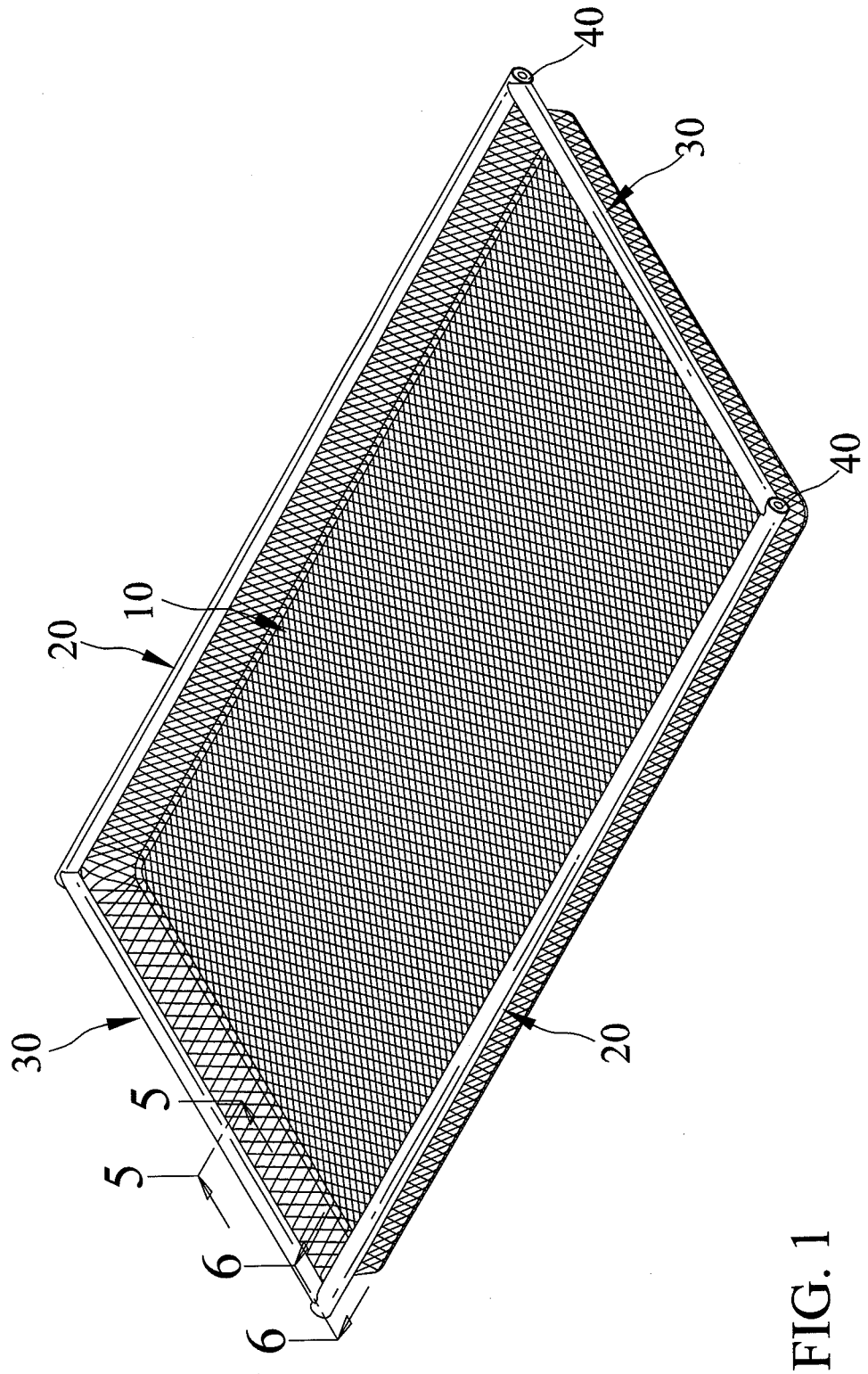
FIG. 1 shows a perspective view of a roof assembly for a storage cart according to the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENT

Figure 2:
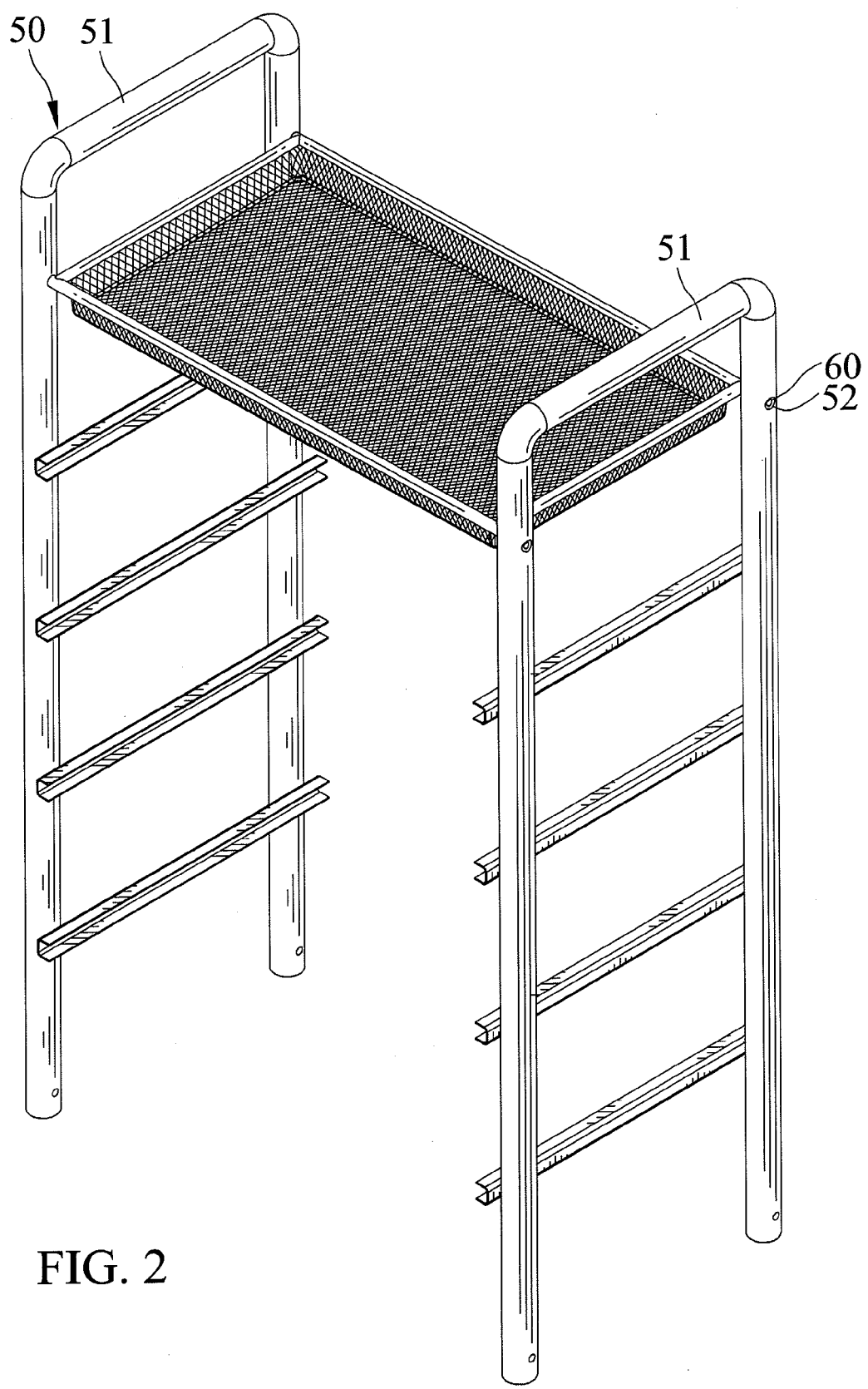
FIG. 2 shows a perspective view of the roof assembly for the storage cart of FIG. 1, and illustrates the roof assembly mounted on a top end of the storage cart.
Figure 3:
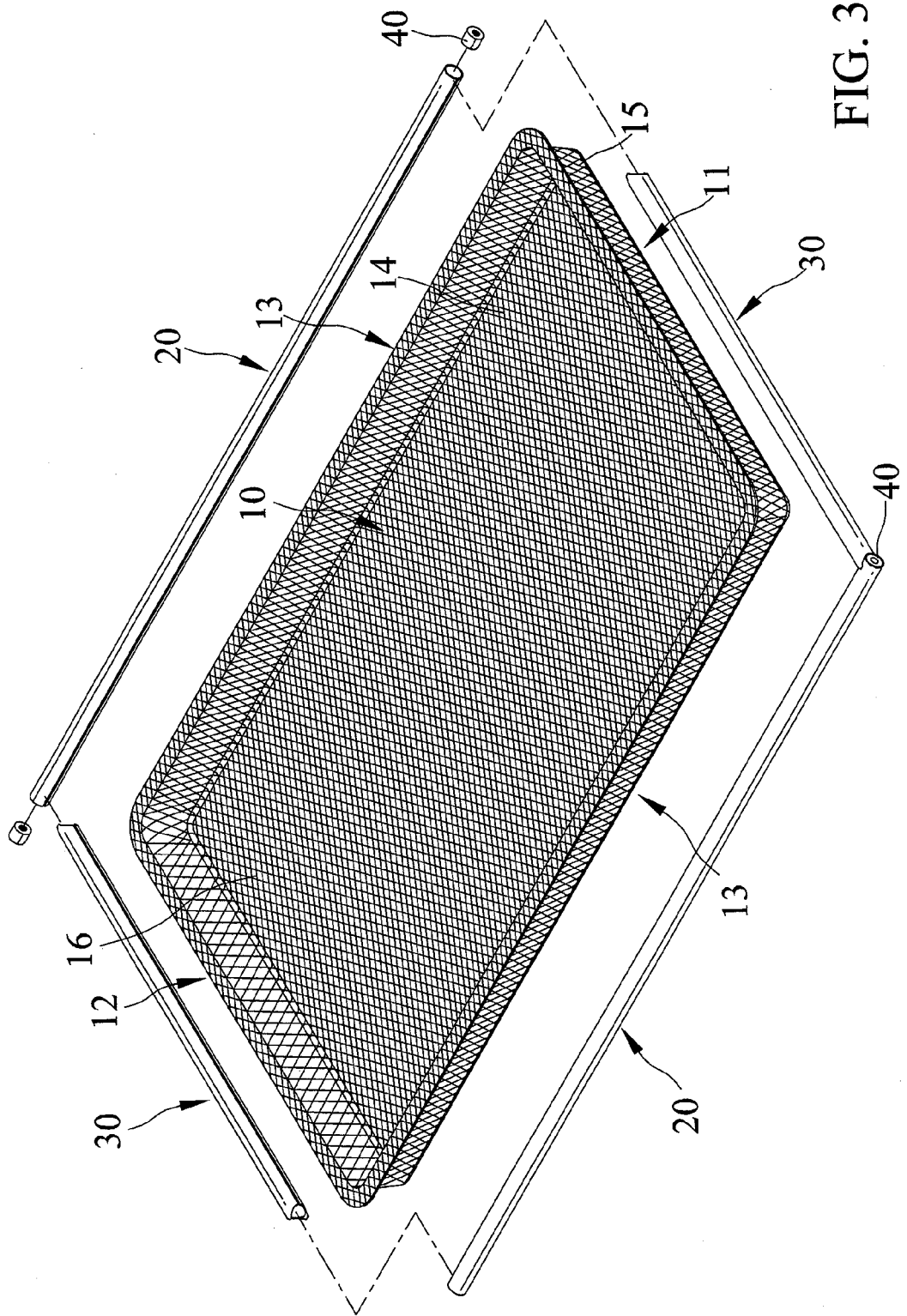
FIG. 3 shows an exploded, perspective view of the roof assembly for the storage cart of FIG. 1.
Figure 4:
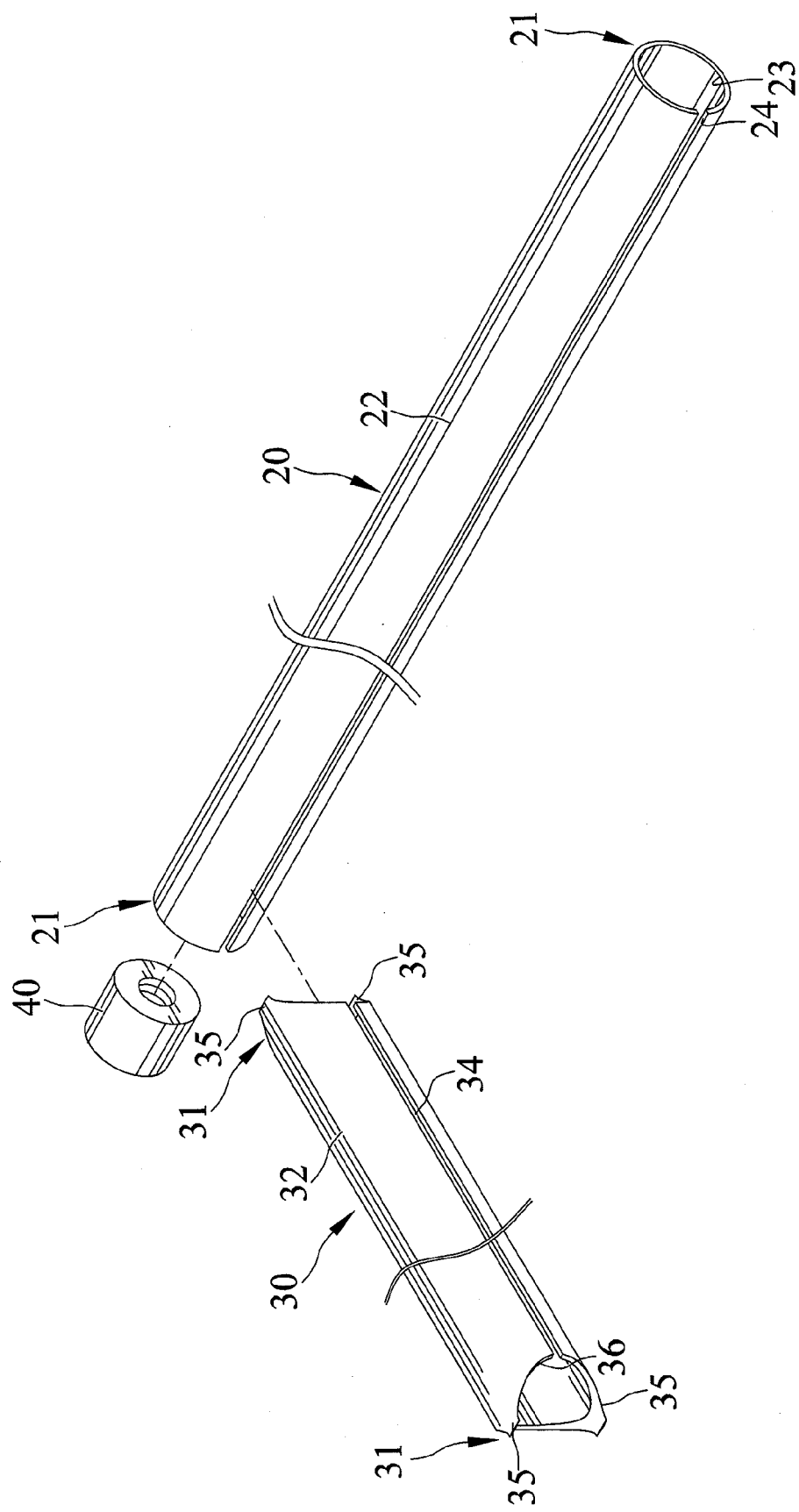
FIG. 4 shows an enlarged view of the roof assembly for the storage cart of FIG. 3.
Figure 5:
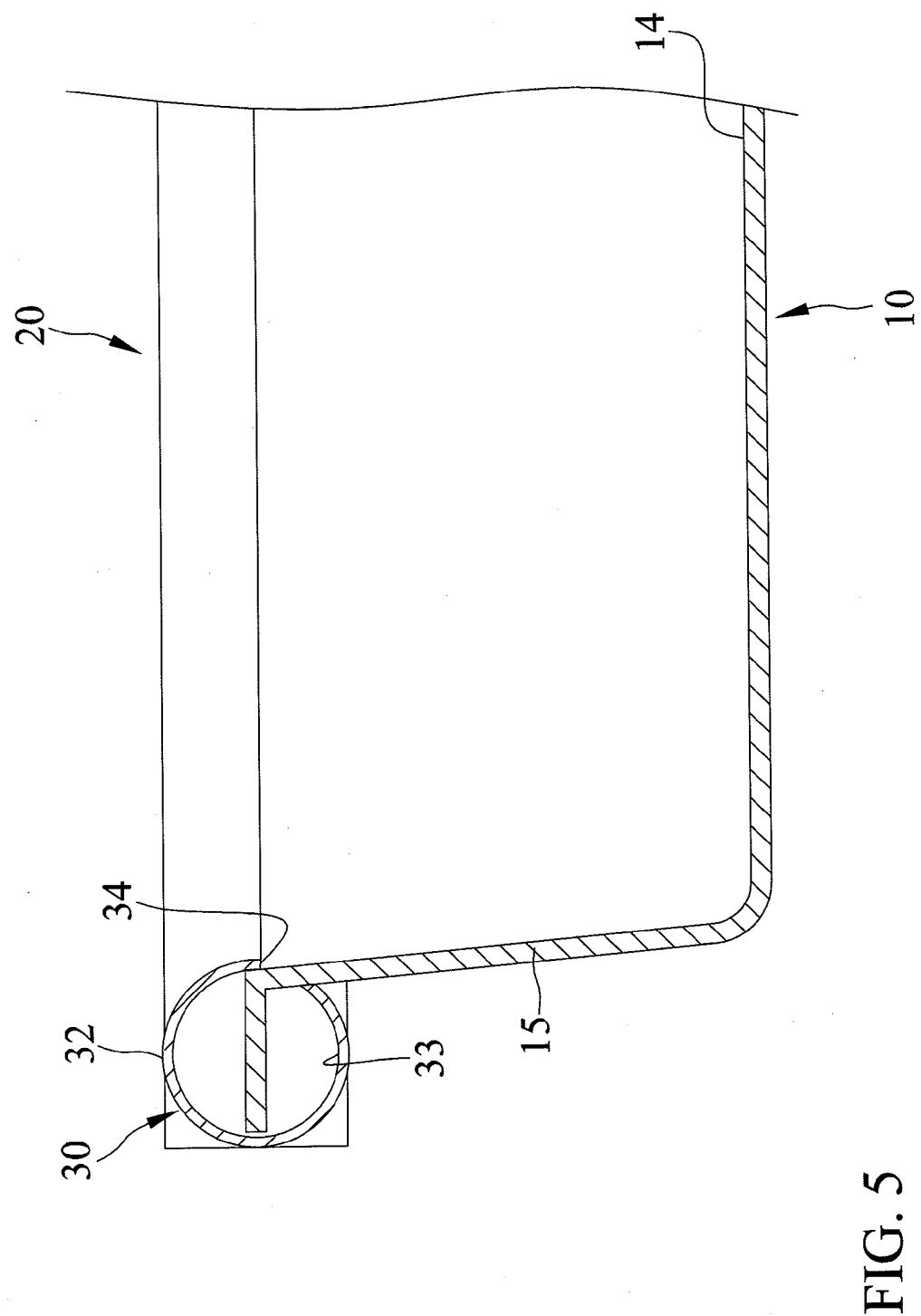
FIG. 5 shows a cross-sectional view taken along line 5-5 of FIG. 1.
Figure 6:
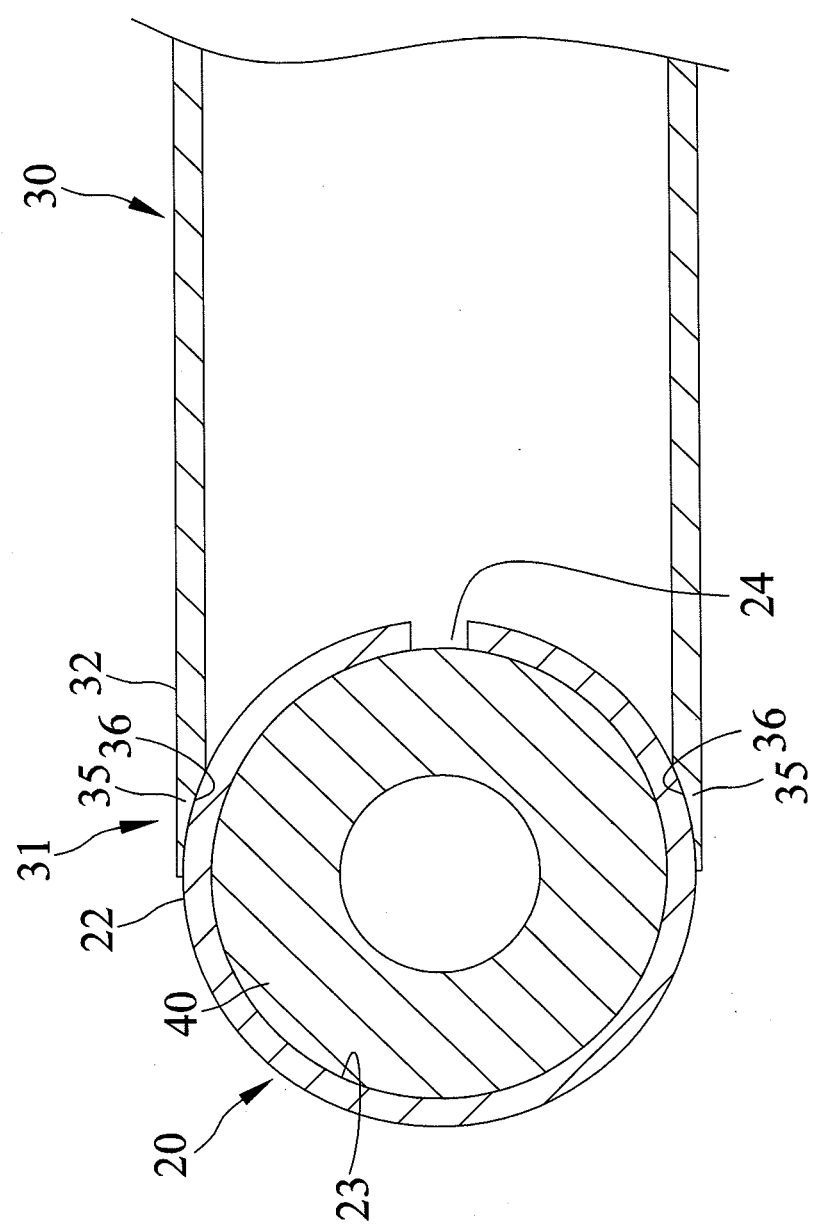
FIG. 6 shows a cross-sectional view taken along line 6-6 of FIG. 1.

A roof assembly for a storage cart according to the preferred teachings of the present invention is shown in the drawings. In the preferred forms shown in FIGS. 1 through 6, the roof assembly includes a supporting element 10, a pair of first fixing elements 20, a pair of second fixing elements 30, and four connecting elements 40. The pair of first fixing elements 20 and the pair of second fixing elements 30 engage and completely cover around a periphery of the supporting element 10. Two of the four connecting elements 40 are mounted at two opposite ends of each of the first fixing elements 20. In the embodiment, the connecting element 40 is a nut. Therefore, a storage cart 50 including a frame 51 and holes 52 does not need to install or form additional supports for connecting with the roof assembly. Fasteners 60, such as screws can pass through the holes 52 of the storage cart 50 and engage with the connecting elements 40 to cause the roof assembly securely connected with the storage cart 50. The roof assembly is adapted for covering drawers (not shown) of the storage cart 50 and placing objects thereon.

The supporting element 10 may be made of plastic plates (e.g., PS, PVC, PP, ABS), cloth, or common industrial pre-forming metal wire mesh. In this embodiment, the supporting element 10 is made of an iron wire mesh having diamond meshes, so that the supporting element 10 is lightweight and only has a small area to need electroplated. The supporting element 10 includes first and second edges 11 and 12, two side edges 13 extending between the first and second edges 11 and 12 thereof, a bottom 14, and a peripheral wall 15 connecting to the a bottom 14. The bottom 14 of the supporting element 10 has a rectangular cross section parallel to a direction extending from the first edge 11 to the second edge 12. The first and second edges 11 and 12, and the two side edges 13 are bent to form the peripheral wall 15. Furthermore, together the peripheral wall 15 and the bottom 14 form a receiving space 16 for placing the objects.

The pair of first fixing elements 20 is mounted at the two side edges 13 of the supporting element 10. Each of the first fixing elements 20 is C-shaped hollow cylinder and includes two connecting ends 21 disposed at two opposite ends thereof, external and internal faces 22 and 23, and a first gap 24 extending between the two connecting ends 21 and connecting with the external and internal faces 22 and 23. The two first gaps 24 of the pair of first fixing elements 20 are engaged with the two side edges 13 of the supporting element 10. Moreover, the external face 22 of each of the first fixing elements 20 has an outer diameter defined therein.

The pair of second fixing elements 30 is mounted at the first and second edges 11 and 12 of the supporting element 10 and connected with the pair of first fixing elements 20. Each of the second fixing elements 30 is C-shaped hollow cylinder and includes two engaging ends 31 disposed at two opposite ends thereof, external and internal surfaces 32 and 33, and a second gap 34 extending between the two engaging ends 31 and connecting with the external and internal surfaces 32 and 33. The two second gaps 34 of the pair of second fixing elements 30 are respectively engaged with the first and second edges 11 and 12 of the supporting element 10. Each of the second fixing elements 30 further includes two pairs of extending portions 35 respectively formed at the two engaging ends 31. The two pairs of extending portions 35 are respectively extended and tapered outwardly from the two engaging ends 31 of each of the second fixing elements 30. Each of extending portions 35 has a length. The length of the extending portion 35 is equal to or great than a half of the outer diameter of the external face 22.

Each pair of extending portions 35 is formed arc engaging surfaces 36 connecting with the internal surface 33. A curvature of the arc engaging surface 36 is same as that of the external face 22 of the first fixing element 20

In assembly of the roof assembly for the storage cart 50 according to the preferred teachings of the present invention, two of the four connecting elements 40 are mounted in the two connecting ends 21 of each of the first fixing elements 20 to cause an outer periphery of each of the connecting elements 40 closely attached against the internal face 23 of the first fixing element 20. Then, the arc engaging surfaces 36 of each pair of extending portions 35 are closely attached to the external face 22 of each of the first fixing elements 20. Therefore, the connecting elements 40, the first fixing elements 20, and the second fixing elements 30 can securely connect to each other by one time spot welding to decrease manufacturing process and manufacturing costs.

Moreover, the curvature of the arc engaging surface 36 is same as that of the external face 22 of the first fixing element 20, so that junctions formed between the external surfaces 32 of the pair of second fixing elements 30 and the external faces 22 of the pair of first fixing elements 20 are smooth.

The roof assembly for the storage cart 50 includes the following advantages:

1. A curvature of the arc engaging surface 36 is same as that of the external face 22 of the first fixing element 20. Therefore, the arc engaging surface 36 of the second fixing element 30 is able to closely attach to the external face 22 of the first fixing element 20 and securely connected with the external face 22 of the first fixing element 20. Moreover, junctions between the external surfaces 32 of the pair of second fixing elements 30 and the external faces 22 of the pair of first fixing elements 20 are smooth.

2. The supporting element 10 may be made of plastic plates, cloth, or common industrial pre-forming metal mesh product, so that the supporting element 10 is lightweight and only has a small area to need electroplated.

3. The storage cart 50 including a frame 51 and holes 52 does not need to install or form additional supports for connecting with the roof assembly.

4. Two of the four connecting elements 40 are mounted in the two connecting ends 21 of each of the first fixing elements 20 to cause an outer periphery of each of the connecting elements 40 closely attached against the internal face 23 of the first fixing element 20. Then, the arc engaging surfaces 36 of each pair of extending portions 35 are closely attached to the external face 22 of each of the first fixing elements 20. Therefore, the connecting elements 40, the first fixing elements 20, and the second fixing elements 30 can securely connect to each other by one time spot welding to decrease manufacturing process and manufacturing costs.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A roof assembly for a storage cart comprising:
    a supporting element including first and second edges, and two side edges extending between the first and second edges;
    a pair of first fixing elements connected with the supporting element, with each of the first fixing elements including two connecting ends disposed at two opposite ends thereof, external and internal faces, and a first gap extending between the two connecting ends and connecting with the external and internal faces thereof; with the two first gaps of the pair of first fixing elements respectively engaged with the two side edges of the supporting element so that the first fixing elements cover the two side edges of the supporting elements;
    a pair of second fixing elements connected with the supporting element and the pair of first fixing elements, with each of the second fixing elements including two engaging ends disposed at two opposite ends thereof; external and internal surfaces, a second gap extending between the two engaging ends and connecting with the external and internal surfaces, and two pairs of extending portions, with each of the two second gaps of the pair of second fixing elements respectively engaged with the first and second edges of the supporting element so that the second fixing elements cover the first and second edges of the supporting element, with each pair of extending portions forming engaging surfaces connecting the internal surface, with the engaging surfaces of each pair of extending portions attached to the external face of each of the first fixing elements, with junctions formed between the external surfaces of the pair of second fixing elements and the external faces of the pair of first fixing elements; and
    four connecting elements, with two of the four connecting elements mounted in the two connecting ends of each of the first fixing elements, with an outer periphery of each of the connecting elements abutted against the internal face of each of the first fixing elements, with the four connecting elements adapted for engaging with fasteners passing holes of the storage cart to cause the roof assembly securely connected with the storage cart.

2. The roof assembly for the storage cart as claimed in claim 1, wherein the supporting element further includes a bottom having a rectangular cross section parallel to a direction extending from the first edge to the second edge, and a peripheral wall connecting to the bottom, with the peripheral wall and the bottom forming a receiving space for placing the objects.

3. The roof assembly for the storage cart as claimed in claim 1, wherein each of the first and second fixing elements is a C-shaped hollow cylinder.

4. The roof assembly for the storage cart as claimed in claim 3, wherein the engaging surface is formed in an arc shape.

5. The roof assembly for the storage cart as claimed in claim 4, wherein a curvature of the arc engaging surface is same as that of the external face of the first fixing element.

6. The roof assembly for the storage cart as claimed in claim 1, wherein the two pairs of extending portions are respectively extended along a circle tangent direction of the cross section of each of the second fixing elements and tapered outwardly from the two engaging ends of each of the second fixing elements.

7. The roof assembly for the storage cart as claimed in claim 1, wherein the supporting element is made of plastic plates.

8. The roof assembly for the storage cart as claimed in claim 1, wherein the supporting element is made of cloth.

9. The roof assembly for the storage cart as claimed in claim 1, wherein the supporting element is made of metal wire mesh.

10. The roof assembly for the storage cart as claimed in claim 1, wherein the pair of first fixing elements and the pair of second fixing elements engage and completely cover around a periphery of the supporting element.

11. The roof assembly for the storage cart as claimed in claim 1, wherein the external face of each of the first fixing elements has an outer diameter defined therein, and
    wherein each of the extending portions having a length that corresponds to a distance in a longitudinal direction of the second fixing element between a tip of the extending portion and an end of the second gap closest to the tip of the extending portion and that is equal to a half of the outer diameter of the external face.

12. The roof assembly for the storage cart as claimed in claim 1, wherein the external face of each of the first fixing elements has an outer diameter defined therein, and
    wherein each of the extending portions having a length that corresponds to a distance in a longitudinal direction of the second fixing element between a tip of the extending portion and an end of the second gap closest to the tip of the extending portion and that is great than a half of the outer diameter of the external face.

* * * * *